United States Patent Office 3,442,118
Patented May 6, 1969

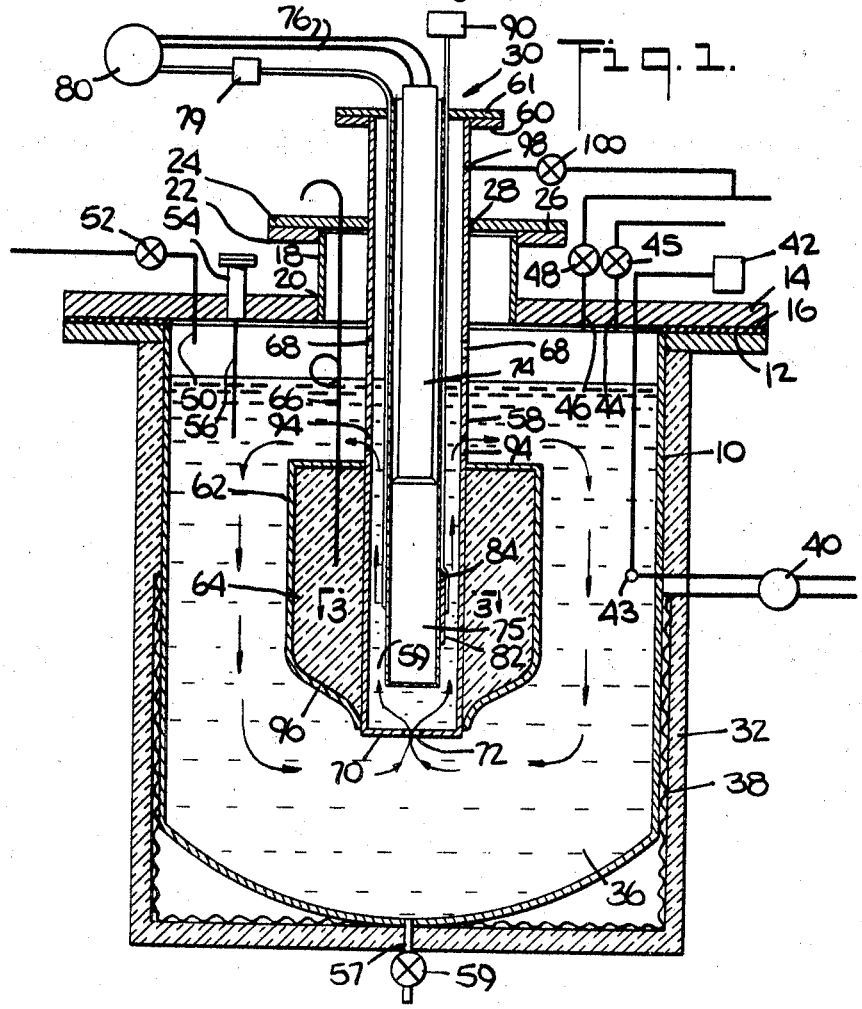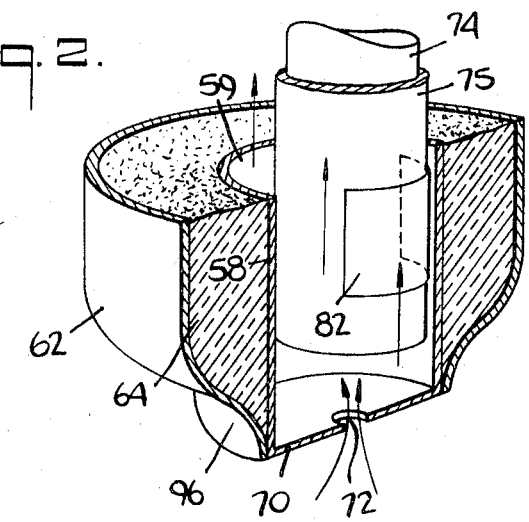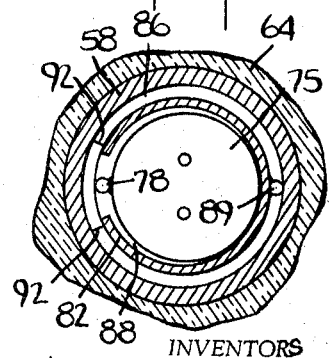

3,442,118
DEVICE FOR TESTING A BODY OF FLUID
Herbert O. Muenchow, Northville, Harry V. Chamberlain and Wayne L. Chase, Royal Oak, and Joseph Bucki, Allen Park, Mich., assignors to Atomic Power Development Associates, Inc., Detroit, Mich., a corporation of New York
Filed Aug. 6, 1965, Ser. No. 477,736
Int. Cl. G01n 11/02
U.S. Cl. 73—61                                                                    9 Claims

ABSTRACT OF THE DISCLOSURE

A testing device including an elongated member immersible in a body of fluid. A chamber is disposed internally of the member and a heating element is disposed within the chamber. A sample of solid material upon which the fluid is to be tested is carried by the heating element. The chamber contains a lower inlet and an upper outlet for the flow of the liquid, and is adapted to direct the fluid into contact with the sample of solid material during its passage therethrough.

---

This invention pertains to apparatus and methods for the elevated temperature testing of metals in a molten or otherwise liquid state for determining the presence and amount of impurities or contaminants present therein.

The invention finds particular application to the testing for impurities in metals employed in the liquid state for heat transfer purposes in nuclear reactors and the like, for transferring heat generated in the reactor cores to a source of utilization outside the reactor, such as a steam generator.

Certain types of nuclear reactors empoly as a core assembly for generation of heat, a series of metal tubes or shells containing a nuclear fuel, such for example as a uranium-plutonium alloy in which $Pu^{239}$ is a fissile material and $U^{238}$ a fertile material. The heat generated by nuclear fission is conducted away from the core by continuous circulation of liquid or molten metal through the core and in contact with the outer surfaces of the fuel tubes or through conduits extending through the shells out of contact with the fuel. The metal employed in a liquid state for such heat transfer purposes is generally molten sodium or a sodium-potassium alloy although other metals in a liquid state may be similarly employed, such as mercury or molten lithium or caesium or equivalent. For the metal tubes or shells in which the nuclear fuel is disposed, such metals have been found suitable as low carbon, chrome-nickel stainless steel, e.g., type 304, or zirconium or Zircaloy, the latter comprising an alloy of zirconium and a small percentage of tin.

The core of such reactors is generally operated at temperatures on the order of 1200° F. while the liquid heat transfer metal is normally maintained at a minimum of about 600° F. so that the heat transfer differential is about 600–700° F. At these temperatures the above mentioned heat transfer metals are highly reactive chemically and tend to pick up contaminants from any available source, especially carbon, hydrogen and oxygen.

Accordingly, after a period of operation of the reactor the liquid heat transfer metal becomes appreciably contaminated with such impurities, which at the relatively high temperature of the reactor core in turn react with the metal of the fuel containing tubes to embrittle and corrode the same with resultant ultimate breakdown of these tubes. Thus, if the tubes are made of low carbon stainless steel, they become carburized and thus embrittled by carbon contamination of the liquid transfer metal. On the other hand if the tubes are made of zirconium or Zircaloy they are susceptible to rapid pickup of oxygen, hydrogen or carbon contamination of the heat transfer metal with resultant embrittlement and ultimate breakdown.

A primary object of the present invention is to provide an apparatus and method for testing the liquid heat transfer metal and under conditions simulating those encountered in operation of the nuclear reactor for determining the extent of contamination thereof with contaminants of the character above mentioned.

In accordance with the basic principle of the invention a bath of the metal to be tested maintained in a liquid state at about 600° F., is circulated upwardly through an annular passageway formed between an annular thermally insulating member and a concentrically disposed heated prong or "hot finger" about which latter is wrapped a metal strip or test coupon made of stainless steel, zirconium, Zircaloy, tantalum, titanium or the like. The hot finger is electrically heated to a temperature of about 1200–1300° F. to simulate the surface temperature of the fuel tube in a nuclear reactor core. The metal selected for the test coupon is usually the same as that employed for the fuel tubes of the reactor, the liquid transfer metal of which reactor is to be tested for contamination from time to time. Thus as the liquid metal is caused to flow upwardly in the annular space between the insulating member and the hot finger, the metal strip test coupon is subjected to the same exposure conditions of the liquid heat transfer metal as in the reactor core, and the test coupon will pick up any contaminants therein in the same manner and to the same extent as do the fuel tubes in operation of the reactor. After the test has thus been continued for a sufficient duration, the test coupon is removed and analyzed for pickup of contaminants as to character and amount.

It will be appreciated that the bath of metal to be tested does not have to be contained in a pot or casing, but the device can be inserted into the coolant in a nuclear reactor or other tank or pipe to test the purity of the coolant.

Having thus described the invention in general terms, reference will now be had to the accompanying drawings wherein:

FIG. 1 is a vertical, medial, sectional elevation of a testing device constructed in accordance with the concepts of this invention;

FIG. 2 is an enlarged fragmentary perspective showing of the chamber, heating element or hot finger and the test coupon wrapped thereabout;

FIG. 3 is an enlarged fragmentary sectional view as taken at 3—3 of FIG. 1.

In the embodiment of the invention illustrated, the testing device comprises a casing or test pot 10 having a closed bottom and a flanged upper end 12. A cover 14 closes the opened end of the test pot 10 and is connected to the flange 12 as at 16. The cover 14 includes a centrally disposed cylindrical neck portion 18, which is fixedly connected as at 20, the neck portion 18 being provided with an upper flange 22, which is adapted to receive a neck cover 24. The neck cover 24 is removably secured to the flange 22 as at 26, and is centrally bored as at 28 for purposes of receiving a prong or hot finger assembly designated generally at 30 (FIG. 1).

As best seen in FIG. 1, the test pot 10 is made of a material which is suitable for containing the liquid or molten metal 36 to be tested. The pot 10 is housed in a thermally insulatory material 32 for purposes of retaining the liquid metal 36 to be tested, at the desired elevated temperature. For example, if molten sodium is to be tested, it has a melting point of 208° F. and the bath operates preferably at about 250° F. to about 1,000° F.

and preferably at a temperature of the order of about 600° F. In order to maintain the molten metal bath in the test pot 10 at a preselected elevated temperature, strip heater elements 38 are wrapped around the circumference of the test pot. The temperature of the bulk bath 36 is automatically controlled by controlling the power input to the heater 38 by means of a control 40, the signal to the control coming from the thermocouple 42 which is provided with a junction 43 immersed in the liquid 36 as shown.

The test pot 10 contains a vent and vacuum nozzle 44, including a control valve 45 for purposes of venting the pot or for purposes of subjecting the interior of the pot to a subatmospheric pressure during the testing operation, if desired. The test pot 10 further comprises an argon cover gas nozzle 46 as well as a control valve 48 therefor. The purpose of this is to fill the upper portion of the test pot, above the level of the metal bath 36 to be tested, with an inert argon atmosphere to prevent contamination of the metal bath being tested from outside sources of contamination, such as oxygen, for example.

Further, the test pot 10 contains an argon inlet nozzle 50, which is controlled by valve 52. When tests are about to be made with molten sodium, for example, the test pot is heated, evacuated and purged with argon to remove any residual moisture and oxygen which may be present. For additional accuracy the test pot may be purged several times with argon for removal of the moisture and oxygen.

The cover 14 contains a nozzle 54 wherein a sampling wire 56 may be inserted into the bath 36 to obtain information relating to the reaction of such material with the bulk bath 36 at the temperature thereof. For example, a stainless steel wire may be inserted in the molten sodium bath for carbon detection, or zirconium can be used to detect oxygen or hydrogen.

At the base of the test pot 10 is a nipple 57 and a drain valve 59 for purposes of removing the test fluid 36 from the test pot.

The hot finger assembly 30 comprises a tubular member 58, which may be fabricated from stainless steel tubing, having secured to the top thereof a flange 60. A cover flange 61 mates in sealing relationship with flange 60. Also, the tube 58 is adapted to pass through the bore 28 and is fixedly attached to the neck cover 24 in sealed relationship therewith.

As best seen in FIG. 2, the lower portion of the tube 58 is surrounded by a hollow, annular member 62 which may be fabricated from stainless steel or the like. Member 62 is packed with insulating material 64 to minimize heat transfer between the hot finger assembly 30 and the molten bath 36 in the pot 10. Member 62 is vented through the cover 24 by vent line 66 to prevent pressure build-up therein upon heating the testing device up to its operating temperature.

The bottom of the tube 58 is closed by a plate 70 having an opening therein 72 for the flow of liquid metal 36 to be tested, in order to obtain a relatively low rate of flow of fluid therethrough. As will be discussed more fully hereinafter, a low rate of flow will reduce the quantity of liquid metal within the tube 58, and hence, will allow the metal to be heated to a higher temperature. Other types of opening 72 may be provided. For example, a perforated baffle, a multiholed single plate, or a multiholed multiplate construction may be employed.

The hot finger assembly 30 further includes a heater element 74 centrally disposed within the tubular member 58. The lower portion of the heater element 74 contains a tubular heater 75. As best seen in FIGS. 1 and 3, attached to the heater 75 is control member 80 having a junction 78 for a thermocouple 79 for use in controlling the heater temperature by means of controlling the power input to the heater 75 through the electrical leads 76.

Referring to FIG. 2, a foil 82 of sheet metal wrapped around the tubular heater 75 of the heater element 74 and held in place. A portion of the foil 82 is connected to the tubular heater 75 as at 83, FIG. 3. As seen in FIGS. 1 and 3, a junction 89 of a thermocouple 90 is welded to the face of the foil 82 for purposes of ascertaining the precise temperature of the foil during operation. Still referring to FIG. 3, stainless steel wires or strips 92 are disposed towards the sides of the foil 82 for purposes of positioning the foil with respect to the heating element 75 and the tubular member 58.

As best seen in FIG. 1, the tubular member 58 and the heating element 75 conjointly form an annular passageway or chamber 59 through which the fluid 36 passes. As seen in FIG. 3, the annular passageway or chamber is divided by means of the foil 82, thereby forming an outside substantially annular chamber 86 and an inside substantially annular chamber 88. Referring back to FIG. 1, outlets 94 are provided in the tubular member 58 above the annular member 62 and also above the tubular heater 75 of the heater element 74 for purposes of discharging the heated liquid from the chamber 59 and returning it to the bath contained in the pot 10. In operation, the liquid 36 flows upwardly through the opening 72, through the passageway 59, and up to the foil of solid material 82. When the liquid is passing adjacent the foil 82, it passes through the passages 86 and 88 (FIG. 3), and hence passes in direct contact with said foil. Thereafter, the fluid 36 passes upwardly within the tubular member 58 until it reaches the outlet openings 94 (FIG. 1) where it is discharged to the bath contained within the pot 10. The fluid then flows downwardly along the outside of the member 62 as shown by the arrows in FIG. 1 and eventually back to the opening 72 in the bottom of the tubular member 58. In this manner, the liquid is continually recirculated. In the illustrated embodiment, the liquid 36 is circulated as aforesaid by means of natural convection. That is, the heating element 75 heats the liquid passing through the passageway 59 to a sufficient degree in order to cause it to pass upwardly through said passage and out through the openings 94 due to the density differential.

The lower portion of the tubular member 58 is encased by the member 62 and the insulation 64 in order to retain this portion of the passageway 59 at an elevated temperature with respect to the surrounding bath. For example, if liquid sodium is to be tested, the hot finger assembly temperature may be of the order of about 1200° F. while the bulk sodium temperature may be 600, 800 or 1000° F. depending upon the conditions desired, the temperature depending upon the reaction rate of the contaminate with respect to the foil. Also, it is within the concept of this invention to employ auxiliary pumping means, if desired. It is noted that vent holes 68 (FIG. 1) are provided in the tubular member 58 above the fluid level in order to prevent pressure buildup in the tubular member 58 when raising the bulk fluid 36 to operating temperature.

As seen in FIG. 1, the tubular member 58 contains an argon cover gas nozzle 98 as well as a control valve 100 therefor. The purpose of this is to fill the upper portion of the tubular member 58, above the level of the fluid to be tested, with an inert argon atmosphere to prevent contamination of the fluid being tested from outside sources of contamination, such as oxygen, for example.

Although a particular embodiment of the invention is herein disclosed for purposes of explanation, further modifications thereof after study of this specification, will be apparent to those skilled in the art to which the invention pertains. Reference should accordingly be had to the appended claims in determining the scope of the invention.

What is claimed and desired to be secured by Letters Patent is:

1. A testing device comprising a pressure tight test pot arranged to contain a fluid to be tested, heating means for said test pot, means for insulating at least a portion of said test pot, means for sensing the temperature of the fluid contained in said test pot, means for controlling said heat means in response to the temperature so sensed, means for venting said test pot, means for purging the inside of said test pot with argon for removing moisture and oxygen contained therein, means for providing an inert gaseous cover in the upper portion of said test pot between said cover and said liquid, means for inserting a sample of solid material in said test pot; a chamber internally of said test pot, a heating element disposed within said chamber and arranged to support a second sample of solid material, said chamber containing a lower inlet and an upper outlet for the flow of said fluid therethrough, and said chamber being adapted to direct said fluid into contact with said second sample during its passage through said chamber.

2. A testing device comprising a test pot arranged to contain a fluid to be tested, a vertically disposed tubular member internally of said test pot, an elongated heating element concentrically disposed within said tubular member, means for supporting a sample of solid material upon which said fluid is to be tested whereby said solid material is in foil form disposed between said heating element and said tubular member, at least a pair of oppositely located thermocouple junctions, one of which engages said sample of solid material and the other engages said heating element for controlling said heating element, and insulation material disposed around said tubular member; said heating element and said tubular member being disposed in spaced relationship one with respect to the other to form a passageway therebetween for the flow of said fluid to be tested, the lower portion of said tubular member being provided with a lower restricting inlet and an upper outlet for the passage of said fluid.

3. A testing device comprising a test pot arranged to contain a fluid to be tested, an elongated tubular member vertically disposed within said test pot, an elongated vertically disposed heating element coaxially disposed within said tubular member in spaced relationship with respect thereto, said heating element being adapted to support a sample of solid material in the form of a foil in arcuate contact therewith, support means for connecting the ends of said foil to the inside of said tubular member, means for sensing the temperature of said sample of solid material, means for controlling the heating energy input into said heating element, insulating means surrounding said tubular member, and said tubular member being provided with a lower inlet and an upper outlet for the flow of said fluid therethrough.

4. A testing device comprising a test pot for containing a bath of fluid to be tested, a first heating element wrapped around the outside of said test pot for heating the fluid contained in said bath, insulation material covering said test pot to prevent heat loss therefrom, said test pot having an access opening at one end, a cover for said opening for sealing said test pot, a thermocouple disposed within said bath for controlling said first heating element, means for supplying an inert atmosphere between said bath and said cover, a substantially cylindrically-shaped tubular member vertically disposed and having one end extending into said bath of fluid and having the other end extending outwardly of said test pot through said cover, means for sealing said tubular member with respect to said cover, a hollow annular member encompassing the lower portion of said tubular member, insulating material retained between said tubular member and said hollow annular member, an elongated substantially vertically disposed second heating element positioned within said tubular member, said second heating element being disposed in spaced relationship with respect to said tubular member to form a chamber for the passage of said fluid therebetween, means for supporting a sample of solid material between said heating element and said tubular member, means for sensing the temperature of said sample of solid material, means for controlling the heat energy output of said heating element in response to said so sensed temperature, a bottom cover for said tubular member, said cover having an opening therein for forming an inlet for the flow of said fluid into said chamber, and said tubular member having a plurality of radially extending openings disposed within said pot for the outflow of said fluid from said chamber to said pot.

5. In a method of testing of the character described, the steps comprising; circulating a bath of liquid metal to be tested upwardly through an annular passageway formed between an annular thermally insulating member and a concentrically disposed heated prong about which latter is wrapped a metal strip, and after a preselected period of time removing and analyzing said metal strip.

6. In a method of testing the liquid heat transfer metal of a nuclear reactor for determining the extent of contamination thereof, the steps comprising: circulating a bath of said metal maintained in a liquid state at a temperature substantially the same as the operating temperature of said metal in said reactor upwardly through an annular passageway formed between an annular thermally insulating member and a concentrically disposed prong heated to a temperature to simulate the surface temperature of a fuel tube in the nuclear reactor core about which prong is wrapped a metal strip, and after a preselected period of time removing and analyzing said metal strip.

7. In a method of testing of the character described, the steps comprising: circulating a bath of metal to be tested maintained in a liquid state at a temperature of between about 250° F. and about 1000° F. upwardly through an annular passageway formed between an annular thermally insulating member and a concentrically disposed element heated to a temperature of between about 1000° F. and about 1200° F. about which element is wrapped a metal test coupon, and after a preselected period of time removing and analyzing said test coupon.

8. In a method of testing the liquid heat transfer metal of a nuclear reactor for determining the extent of contamination thereof, the steps comprising: circulating a bath of said metal chosen from the group consisting of molten sodium, sodium-potassium alloy, mercury, molten lithium or caesium upwardly through an annular passageway formed between an annular thermally insulating member and a concentrically disposed heating element about which latter is wrapped a metal strip chosen from the group consisting of low carbon, chrome-nickel stainless steel, zirconium or Zircaloy, and after a preselected period of time removing and analyzing said metal strip.

9. In a method of testing of the character described, the steps comprising: forming a bath of liquid to be tested, heating said liquid to be tested to a first preselected temperature, inserting a first sample upon which said liquid is to be tested into said bath, providing a chamber having a lower inlet and an upper outlet, inserting said chamber into said bath, introducing a second sample upon which said liquid is to be tested into said chamber, heating said chamber to cause said liquid to flow through said chamber in direct contact with said second sample by natural convection, allowing said liquid to flow for a preselected period of time, and removing and analyzing said first and second samples.

References Cited
UNITED STATES PATENTS

| | | | |
|---|---|---|---|
| 2,270,389 | 1/1942 | Straub et al. | 73—154 |
| 2,636,974 | 4/1953 | Bowen | 219—314 |
| 3,222,916 | 12/1965 | Davis | 73—15 |
| 3,148,534 | 9/1964 | Benson | 73—61.2 |

S. CLEMENT SWISHER, *Primary Examiner.*

WM. HENRY II, *Assistant Examiner.*

U.S. Cl. X.R.

219—314